(12) United States Patent
Sanap et al.

(10) Patent No.: US 11,258,808 B2
(45) Date of Patent: Feb. 22, 2022

(54) METHODS AND SYSTEMS FOR IDENTIFICATION OF BREACH ATTEMPTS IN A CLIENT-SERVER COMMUNICATION USING ACCESS TOKENS

(71) Applicant: Mastercard International Incorporated, Purchase, NY (US)

(72) Inventors: Vickhram Sanap, Pune (IN); Girish Ramesh Khemani, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 333 days.

(21) Appl. No.: 16/507,860

(22) Filed: Jul. 10, 2019

(65) Prior Publication Data

US 2020/0045065 A1 Feb. 6, 2020

(30) Foreign Application Priority Data

Aug. 2, 2018 (SG) .......................... 10201806602V

(51) Int. Cl.
H04L 29/06 (2006.01)

(52) U.S. Cl.
CPC ............................ H04L 63/1416 (2013.01)

(58) Field of Classification Search
CPC ............. H04L 63/1416; H04L 63/1483; H04L 63/0823
USPC .......................................................... 726/23
See application file for complete search history.

(56) References Cited

U.S. PATENT DOCUMENTS

| 7,865,731 | B2* | 1/2011 | Kilian-Kehr | ........ H04L 63/0853 |
| | | | | 713/172 |
| 8,528,067 | B2* | 9/2013 | Hurry | .................. G06Q 20/355 |
| | | | | 726/9 |
| 8,973,118 | B2* | 3/2015 | Fitzpatrick, III | ..... H04L 9/3213 |
| | | | | 726/7 |
| 9,219,736 | B1* | 12/2015 | Lewis | ..................... H04L 67/16 |
| 9,275,219 | B2* | 3/2016 | Cross | .................... H04L 63/083 |

(Continued)

OTHER PUBLICATIONS

"PCT Notification of Transmittal of the International Search Report and the Written Opinion", International Searching Authority, dated Oct. 21, 2019, International Application No. PCT/US2019/039700, 11 pp.

*Primary Examiner* — Badri Narayanan Champakesan
*Assistant Examiner* — Badri Champakesan
(74) *Attorney, Agent, or Firm* — Buckley, Maschoff & Talwalkar LLC

(57) ABSTRACT

Embodiments provide a method of using access tokens for identification of breach attempts in a client-server communication. The method includes receiving, by a server system, a token validation request for validation of a token from an Application Programming Interface (API) server sent from a client device to the API server. The method includes accessing one or more token configuration parameters associated with a valid token. The token configuration parameters include one or more of a number of allowable access attempts using the valid token in the API session and a range of frequency of allowable access attempts using the valid token in the API session. The method includes verifying whether the token conforms to the token configuration parameters associated with the valid token. The method further includes determining a breach attempt associated with the token if the token does not conform to the token configuration parameters.

10 Claims, 11 Drawing Sheets

(56) References Cited

U.S. PATENT DOCUMENTS

| | | | |
|---|---|---|---|
| 9,537,865 B1* | 1/2017 | Borovoy | H04L 63/108 |
| 10,491,576 B1* | 11/2019 | Pfannenschmidt | H04L 63/061 |
| 2004/0059920 A1* | 3/2004 | Godwin | G06F 21/55 |
| | | | 713/183 |
| 2005/0120125 A1* | 6/2005 | Morten | H04L 63/0853 |
| | | | 709/231 |
| 2008/0280626 A1* | 11/2008 | Choi | H04L 63/12 |
| | | | 455/456.1 |
| 2009/0076965 A1* | 3/2009 | Elson | G06F 21/36 |
| | | | 705/55 |
| 2009/0271629 A1 | 10/2009 | Michaud | |
| 2013/0254831 A1* | 9/2013 | Roach | H04L 63/20 |
| | | | 726/1 |
| 2014/0033278 A1* | 1/2014 | Nimashakavi | G06F 21/40 |
| | | | 726/4 |
| 2014/0150080 A1* | 5/2014 | Miller | H04N 21/8355 |
| | | | 726/9 |
| 2015/0047053 A1* | 2/2015 | Chen | G06F 21/10 |
| | | | 726/28 |
| 2015/0254635 A1* | 9/2015 | Bondesen | G06Q 20/36 |
| | | | 705/41 |
| 2015/0281225 A1* | 10/2015 | Schoen | H04L 63/06 |
| | | | 726/9 |
| 2016/0044040 A1* | 2/2016 | Caffary, Jr. | H04L 63/20 |
| | | | 726/4 |
| 2016/0164896 A1* | 6/2016 | Baldonado | H04L 63/1425 |
| | | | 726/23 |
| 2017/0126685 A1* | 5/2017 | Taylor | G06F 21/6209 |
| 2017/0264612 A1* | 9/2017 | Kaushal | H04L 63/168 |
| 2018/0091520 A1* | 3/2018 | Camenisch | H04L 63/102 |
| 2018/0276341 A1* | 9/2018 | Rab | G06F 21/6245 |
| 2019/0052672 A1* | 2/2019 | Kumar | H04L 63/1425 |

* cited by examiner

| CLIENT DEVICE ID | TOKEN | NUMBER OF ACCESS ATTEMPTS | ACCESS ATTEMPTS IN A SECOND | ACCESS ATTEMPTS IN A MINUTE | ACCESS ATTEMPTS IN AN HOUR | ACCESS ATTEMPTS IN A SINGLE DAY | ACCESS PATTERN FOR APPLICATION 'X' | ACCESS PATTERN FOR APPLICATION 'Y' |
|---|---|---|---|---|---|---|---|---|
| XYZ | ABCDEFGHI123 | 3 | 1 | 3 | 6 | 20 | F1F4F7 | F2F4F6 |
| LMO | XYZDEFGHI567 | 4 | 1 | 4 | 10 | 25 | F1F2F3 | F1F4F6 |
| .... | .... | .... | .... | .... | .... | .... | .... | .... |

FIG. 4B

METHODS AND SYSTEMS FOR IDENTIFICATION OF BREACH ATTEMPTS IN A CLIENT-SERVER COMMUNICATION USING ACCESS TOKENS

CROSS-REFERENCE TO RELATED APPLICATION

This application is a U.S. National Stage filing under 35 U.S.C. § 119, based on and claiming benefits of and priority to Singapore Patent Application No. 10201806602V filed on Aug. 2, 2018. The entire disclosure of the above application is incorporated herein by reference for all purposes.

TECHNICAL FIELD

The present disclosure relates to client-server architecture and, more particularly to, identification of breach attempts in a client-server communication.

BACKGROUND

In a typical client-server architecture, clients and servers exchange messages in a request and response pattern. For example, the client sends a request, and the server returns a response or vice versa. To communicate, client systems and server systems should have a common language, and they must communicate by following certain rules so that both the client and the server know what to expect in the communication. The language and rules of communication are normally defined in a communications protocol.

In a client-server communication, there may be several Application Programming Interface (API) sessions between a client and a server. An API session may further include several API calls/requests from the client to the server for exchange of data. A server may verify or authenticate a client for exchanging sensitive information with the client for preventing security breaches and phishing related risks. Verification or authentication of a client may be performed using access tokens. An access token contains security credentials for a login session and the access token is used to identify a client/user, and, in some cases, an application. This kind of token is specifically meant for an API. The purpose of the access token is to inform via the API that the holder of this access token has been authorized to access the API and perform specific actions supported by the application.

Currently, access tokens are configured to expire based on time and location. These tokens can also be configured to expire or become invalid upon detection of a breach in the network. However, attempts to use the access tokens for prediction of risk/breach attempt have not been explored much.

Hence, in light of the foregoing discussion, it may be necessary to implement a system and method, wherein access tokens can be employed for breach/risk detection in a client-server communication.

SUMMARY

Various example embodiments of the present disclosure provide methods, systems, user devices and computer program products for using access tokens for identification of breach attempts in a client-server communication. Various embodiments provide a token server for generating tokens and facilitates generation of one or more token configuration parameters for a valid token in response to a token generation request. Various embodiments provide a client device for defining the one or more token configuration parameters, and Application Programming Interface (API) servers for facilitating in identification of breach attempts. Various embodiments further provide a method for validating a token, by the token server in response to a token validation request from an API server.

An embodiment provides a method of using access tokens for identification of breach attempts in a client-server communication. The method includes receiving, by a server system, a token validation request for validation of a token from an Application Programming Interface (API) server sent from a client device to the API server. The method includes accessing, by the server system, one or more token configuration parameters associated with a valid token. The one or more token configuration parameters include one or more of a number of allowable access attempts using the valid token in the API session and a range of frequency of allowable access attempts using the valid token in the API session. The method includes verifying whether the token conforms to the one or more token configuration parameters. The method further includes determining a breach attempt associated with the token if the token does not conform to the one or more token configuration parameters.

Another embodiment provides a server system for using access tokens for identification of breach attempts in a client-server communication. The server system includes a memory including stored instructions and a processor. The processor is configured to execute the stored instructions and thereby cause the server system to perform receiving a token validation request for validation of a token from an API server. The token is sent from a client device to the API server in one or more API calls of an API session. The server system is further caused to perform accessing one or more token configuration parameters associated with a valid token. The one or more token configuration parameters include one or more of a number of allowable access attempts using the valid token in the API session and a range of frequency of allowable access attempts using the valid token in the API session. The server system is further caused to perform verifying whether the token conforms to the one or more token configuration parameters associated with the valid token. The server system is further caused to perform determining a breach attempt associated with the token if the token does not conform to the one or more token configuration parameters.

Another embodiment provides a client device for identification of breach attempts in a client-server communication. The client device includes a memory including stored instructions and a processor. The processor is configured to execute the stored instructions and thereby cause the client device to perform at least facilitating in defining of one or more token configuration parameters for a valid token. The one or more token configuration parameters are defined by a user of the client device. The client device is caused to send a token generation request to a server system. The token generation request includes the one or more token configuration parameters defined by the client device for the valid token. The client device is further caused to receive the valid token generated from the server system and to send an API request for client-server communication to an API server using a token generated based on the one or more token configuration parameters.

Another embodiment provides a method of using access tokens for identification of breach attempts in a client-server communication. The method includes facilitating, by a client device, defining of one or more token configuration parameters. The one or more token configuration parameters are defined by a user of the client device. The method includes sending, to a server system by the client device, a token generation request including the one or more token configuration parameters which are associated with a valid token. The method further includes receiving the valid token from the server system.

Another embodiment provides a method of using access tokens for identification of breach attempts in a client-server communication. The method includes receiving, by an API server, an API request for client-server communication. The API request includes a token that is received by the API server from a client device in one or more API calls of an API session. The method includes sending, by the API server, a token validation request for validation of the token to a server system. The method includes receiving verification information corresponding to whether the token conforms to one or more token configuration parameters. The one or more token configuration parameters are associated with a valid token. The valid token is generated by the token server upon receiving a token generation request from the client device. The one or more token configuration parameters includes one or more of a number of allowable access attempts using the valid token in the API session and a range of frequency of allowable access attempts using the valid token in the API session.

BRIEF DESCRIPTION OF THE FIGURES

For a more complete understanding of example embodiments of the present technology, reference is now made to the following descriptions taken in connection with the accompanying drawings in which:

FIG. 4B illustrates an example representation of a table including one or more token configuration parameters for a client, in accordance with an example embodiment of the present disclosure;

Figure 1:
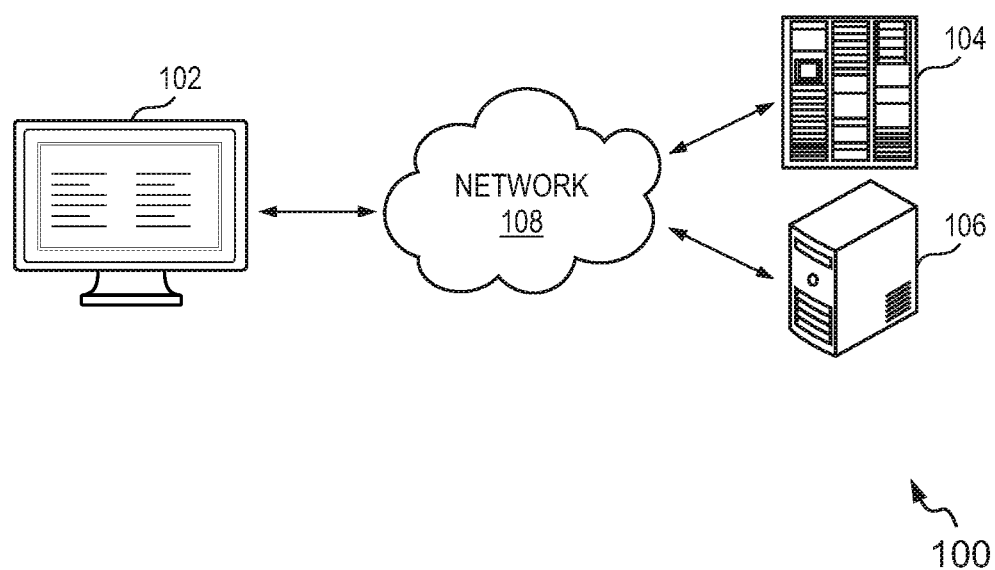
FIG. 1 is an illustration of an example environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices and computer program products for using access tokens for identification of breach attempts in a client-server communication. Various embodiments provide a token server for generating tokens with one or more token configuration parameters in response to a token generation request. Various embodiments provide a client device for defining the one or more token configuration parameters. Various embodiments further provide methods for validating a token, by the token server, in response to a token validation request from an API server.

In various example embodiments, the present disclosure provides a token server, a client device, and an API server. The client device and the API server exchange information through an application. The application may be a payment transaction application or a digital wallet application, as an example. In an embodiment, the client device facilitates defining, by a user, one or more token configuration parameters associated with a valid token, where the valid token is generated by the token server for the client. The token configuration parameters are defined with a view that the any exchange between the client device and the API server should be in conformity with the token configuration parameters. The token configuration parameters are generally stored with the token server. Whenever the client devices uses the token while interacting with the API server, the API server communicates with the token server to check whether the token received from the client device is in conformity with the token configuration parameters or not, and based on such check, authenticity of the token (or occurrence of any breach attempt) is determined.

In an example, the client device sends a token generation request including the one or more token configuration parameters to the token server. An example of the token configuration parameters includes a number of allowable access attempts using a token in an API session. Another example of the token configuration parameters is a range of frequency of allowable access attempts using the token in the API session. The token configuration parameters also include an allowed access pattern of the token for the API session or in a pre-defined period of time. The allowed access pattern for the API session is determined based on historical access patterns followed in previous API sessions.

In response to the token generation request, the token server generates a valid token and sends the valid token to the client device. During an API session between the client device and the API server, the client device may send the valid token to the API server in one or more API calls. In many instances, in a typical client-server communication, the API server may receive malicious API requests from unauthorized sources posing as the client device. These unauthorized sources may send tokens in the API requests, which may be alike in appearance with the valid token generated by the token server. It is desired that the API server validates such tokens with the token server in order to prevent breach attempt by malicious entities, tools or software.

The API server sends a token validation request for validation of the token to the token server. The token validation request includes the token. The token server verifies/determines whether a number of times the token validation request is received from the API server in a given time conforms to the number of allowable access attempts using the token. Further, the token server may also verify whether a frequency at which the token validation request is received from the API server in a pre-defined time interval conforms to the range of allowable frequency of access attempts using the token. Additionally or alternatively, the token server further verifies/determines whether the access pattern associated with the token conforms to historical access patterns. In other words, the token server verifies whether the token received by the API server is same as the valid token generated by the token server. Based on these determinations, the token server verifies whether the token received from the API server is a valid token that conforms to the one or more token configuration parameters. The token server determines a breach attempt associated with the token if the token does not conform to the one or more token configuration parameters. If the token thus received has not conformed to any of the one or more token configuration parameters, validation of the API call is failed and hence a breach attempt may be prevented without the implementation of additional security systems. The token server provides instructions to the client device to renew the token upon determining a breach attempt.

Various example embodiments of the present disclosure are herein explained with respect to FIGS. 1 to 13.

FIG. 1 illustrates an exemplary representation of an environment 100, in which at least some example embodiments of the present disclosure can be implemented. In the illustrated environment 100, a client device 102 is illustrated. The client device 102 is seen to be in operative communication with a token server 104 and an API server 106 via a network 108. In some embodiments, the token server 104 and the API server 106 can be a single entity i.e. embodied within a single server system. The token server 104 and the application server 106 can be examples of logical servers built on cloud computing platform. Alternatively, these servers can be physical servers located at facilities of entities managing these servers.

In an embodiment, the application server 106 hosts an application to be used by various users. Some non-exhaustive examples of the application include a payment transaction application, an authentication application, a loyalty program application, a digital wallet application and an e-commerce application. The API and other components of the application rest on the application server 106. The application can be made available at application stores such as Google playstore managed by Google®, Apple App store managed by Apple®, etc. The application can be downloaded from the application stores, or from other sources such as web links and storage locations, to devices such as the client device 102. The application is a set of computer executable codes configured to perform functions inherently configured in the application. The set of computer executable codes may be stored in a non-transitory computer-readable medium of the client device 102 so as to access the application from the application server 106. The application installed on the client device 102 facilitates an application interface (not shown in FIG. 1) on the client device 102 to enable communication with the application server 106.

The application, as an example, may be a payment transaction application. It shall be noted that accessing the payment transaction application may redirect the client device 102 to establish a connection/session with the token server 104 for generation of tokens comprising the one or more token configuration parameters. It shall be noted that the application may present an interface on the client device 102 that enables defining of the one or more token configuration parameters.

Upon successful generation of tokens comprising the one or more token configuration parameters, an API session may be initiated between the application server 106 and the client device 102 for authentication of the client device 102 or a user of the client device 102 and exchange payment transaction related information upon authentication.

The application server 106 can take example of any server which requires authentication of a user communicating with the application server 106 via a digital token. In an example, the application server 106 may be associated with a financial institution such as an "issuer bank" or "issuing bank" or simply "issuer" or simply "bank", in which a user operating the client device 102 may have an issuer account. The application server 106 includes an issuer database (not shown) for maintaining information such as one or more issuer accounts of the user, transaction history related information, permanent account number (PAN) with which the one or more issuer accounts are linked, etc. Additionally or alternatively, the application server 106 may be associated with a merchant or a Point of Sale (POS) system network.

For example, the application server 106 may be associated with an "acquirer bank" or "acquiring bank" or simply "acquirer", in which a user operating the client device 102 may have an acquirer account. Additional non-limiting examples of the application server 106 may be a digital wallet server and an authentication server.

Some non-exhaustive examples of the token server 104 include a payment server managed by payment cards issuing authorities and/or a payment server associated with a payment interchange network (not shown). Examples of payment interchange network include, but are not limited to, Mastercard® payment system interchange network. The Mastercard® payment system interchange network is a proprietary communications standard promulgated by Mastercard® International Incorporated for the exchange of financial transaction data between financial institutions that are members of Mastercard® International Incorporated. (Mastercard is a registered trademark of Mastercard International Incorporated located in Purchase, N.Y.). Additionally, the application server 106 may be associated with a financial institution, merchant or a POS system network.

In another example, the application server 106 and the token server 104 may be managed by the same entity. For example, the application server 106 and the token server 104 may be managed by a financial institution such as an issuer bank, or by a payment interchange network such as Mastercard® payment system interchange network. In another example, both of the application server 106 and the token server 104 may be managed by a merchant, a POS system network or by a digital wallet server. In another example, the API server 106 and the token server 104 are managed by two separate entities. As an example, the API server 106 may be managed by a financial institution (e.g., issuer) and the token server 104 may be managed by a payment cards issuing authority (e.g. Mastercard®) as a payment interchange network or vice versa. In such cases, it shall be noted that there may be a separate token generation application hosted by the token server 104, which can be accessed on the client device 102. The client device 102 can access the token generation application to define the one or more token configuration parameters and to send the token generation request to the token server 104.

Examples of the client device 102 include, but are not limited to, a smartphone, a tablet, a personal digital assistant (PDA), a notebook, etc. As an example, the client device 102 of FIG. 1 is depicted as a smartphone. However, it shall be understood that, the client device 102 is not limited to a smartphone and can include any electronic device of the likes of a smartphone and having the capability to allow installation of third party applications and communicate with other devices via the network 108.

The client device 102, the application server 106 and the token server 104 may communicate with one another via the communication network 108. The communication network 108 may be a centralized network or may comprise a plurality of sub-networks that may offer a direct communication or may offer indirect communication between the client device 102, the application server 106 and the token server 104. Examples of the communication network 108 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 108 may be or include the Internet, intranets, extranets, microwave networks, satellite communications, cellular systems, personal communication services ("PCS"), infrared communications, global area networks, or other suitable networks, etc., or any combination of two or more such networks.

In an example scenario, if the application is a typical payment transaction application, the client device 102 accesses the application to initiate a payment transaction. As described earlier, it shall be noted that accessing the application may redirect the client device 102 to establish a connection/session with the token server 104 for generation of tokens. Access of the application may present an interface on the client device 102 that enables defining of the one or more token configuration parameters. This may be the case when the token server 104 and the application server 106 can both be accessed via a single application, i.e. a payment transaction application. In an alternate embodiment, the client device 102 may initiate a session with the token server 104 to define the one or more token configuration parameters via a separate application such as a token generation application.

It shall be noted that a user of the client device 102 configures/defines one or more token configuration parameters and sends a token generation request to the token server 104, wherein the token generation request includes the one or more token configuration parameters. In response to the request, the token server 104 generates a token with the one or more token configuration parameters. The client device 102 may, subsequently initiate API calls with the API server 106 using the token. Upon receiving the token, the API server 106 now requests the token server 104 for validation of the token.

Figure 2:
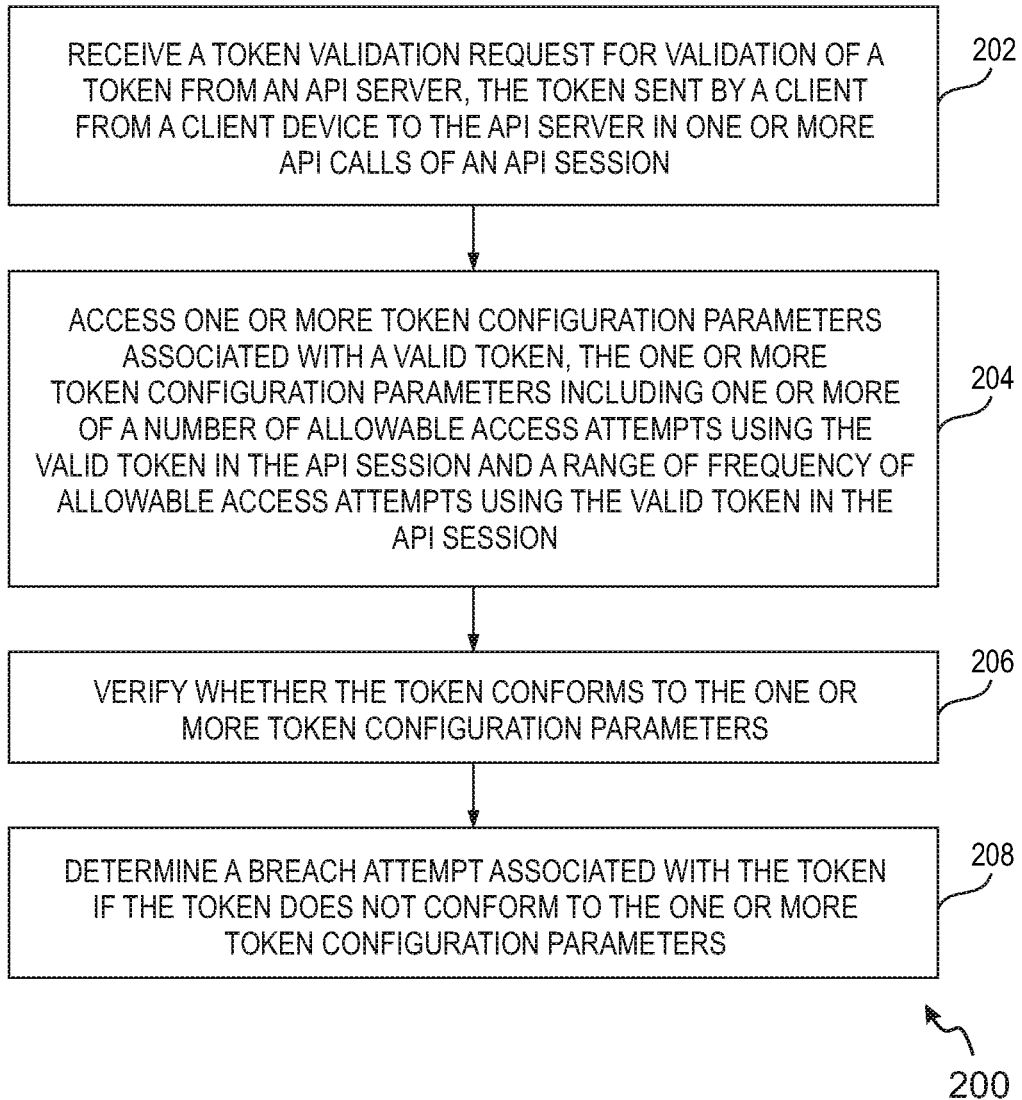
FIG. 2 illustrates a flow diagram of a method for facilitating validation of the token and determining a breach attempt associated with the token, in accordance with an example embodiment of the present disclosure.

FIG. 2 illustrates a flow diagram of a method 200 for facilitating validation of the token and determining a breach attempt associated with the token, in accordance with an example embodiment of the present disclosure. The method 200 depicted in the flow diagram may be executed by, for example, the token server 104. Operations of the flow diagram 200, and combinations of operations in the flow diagram 200, may be implemented by, for example, hardware, firmware, a processor, circuitry and/or a different device associated with the execution of software that includes one or more computer program instructions. The operations of the method 200 are described herein with help of the token server 104. It is noted that the operations of the method 200 can be described and/or practiced by using a system other than the token server 104. The method 200 starts at operation 202.

At 202, the token server 104 receives a token validation request from the API server 106 for validation of a token. The token validation request includes a token. The token may be sent from the client device 102 or any other external devices, software and applications to the API server 106 in one or more API calls of an API session. The token received in the API request may be the valid token generated by the token server 104 for the client device 102. It shall be noted that the valid token is generated by the token server 104 using the one or more token configuration parameters defined by the user in the client device 102. On the other hand, the token received in the API request may not be the valid token generated by the token server 104 for the client device 102 and may be a malicious token sent by an unauthorized entity or software while attempting fraudulent activities.

At 204, the token server 104 accesses the one or more token configuration parameters which are associated with a valid token shared with the client device 102. The one or more token configuration parameters include at least a number of allowable access attempts using the valid token in the API session and a range of frequency of allowable access attempts using the valid token in the API session. Additionally, the one or more token configuration parameters also include an access pattern, which is determined based on historical access patterns. In an example, the historical access patterns may include access patterns of the valid token in a pre-defined time period, for example, last 1 month, or last 2 weeks.

At 206, the token server 104 verifies whether the token conforms to the one or more token configuration parameters. As an example, the token server 104 verifies whether the number of validation requests received from the API server 106 during a predetermined time conforms to the allowable access attempts defined/configured by the user and which was associated with the valid token. Further, the token server 104 verifies whether the frequency of validation requests received from the API server 106 conforms to the allowable frequency range defined/configured by the user which was associated with the valid token. Furthermore, the token server 104 verifies whether the access pattern conforms to the defined access pattern.

At 208, the token server 104 determines a breach attempt associated with the token if the token does not conform to the one or more token configuration parameters. In other words, the token server 104 determines a breach attempt associated with the token if the token is not a valid token that conforms to the one or more token configuration parameters. The token server 104 further provides instructions to the client device 102 to renew the token upon determining a breach attempt.

Figure 3:
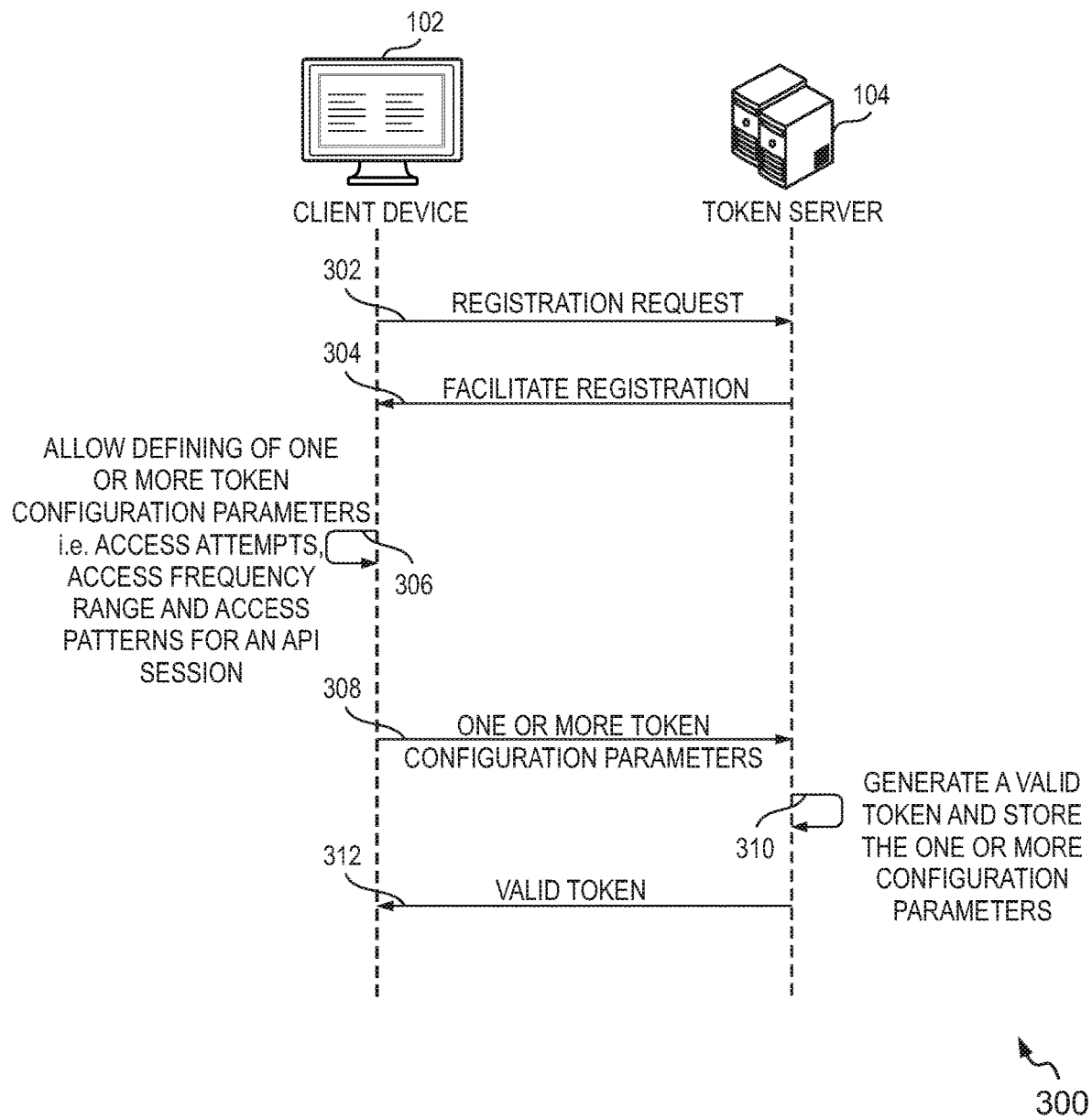
FIG. 3 illustrates a simplified schematic flow diagram representing a method of generating the token by the token server upon receiving the token generation request from the client device, in accordance with an example embodiment of the present disclosure.

FIG. 3 illustrates a simplified schematic flow diagram 300 representing a method of generating the valid token by the token server 104 upon receiving the token generation request from the client device 102, in accordance with an example embodiment of the present disclosure. It shall be noted that the application on the client device 102 may establish a communication with the token server 104 before allowing any API call requests with the API server 106. Alternatively, a token generation application may be accessed in the client device 102 which initiates a token generation session with the token server 104.

At 302, the client device 102 sends a registration request to the token server 104.

At 304, in response to the registration request, the token server 104 facilitates registration of the client device 102 or the user of the client device 102. Herein, facilitating registration may refer to facilitating a user interface on the client device 102. The user of the client device 102 may provide a valid client ID and client authentication parameters as part of registration, which enables the token server 104 to authenticate the client device 102. The token server 104 facilitates a registration interface and allows registration of the user and/or the client device 102.

At 306, the client device 102 allows defining of one or more token configuration parameters of a valid token to be generated. As part of registration, the user of the client device 102 defines or configures one or more token configuration parameters. The one or more token configuration parameters include at least a number of allowable access attempts using the valid token in the API session and a range of frequency of allowable access attempts using the valid token in the API session. Additionally, the one or more token configuration parameters also include an access pattern, which is determined based on historical access patterns. In an example, the historical access patterns may include access patterns in a pre-defined time period, for example, last 1 month, or last 2 weeks.

At 308, the client device 102 sends the one or more token configuration parameters to the token server 104.

At 310, the token server 104 generates the valid token with the one or more configuration parameters. As an example, a generated valid token may appear as 'ABCDEFGHI123'. It shall be noted that even a malicious token may appear as 'ABCDEFGHI123'.

At 312, the token server 104 sends the valid token generated using the one or more configuration parameters to the client device 102 or the application installed at the client device 102.

Figure 4A:
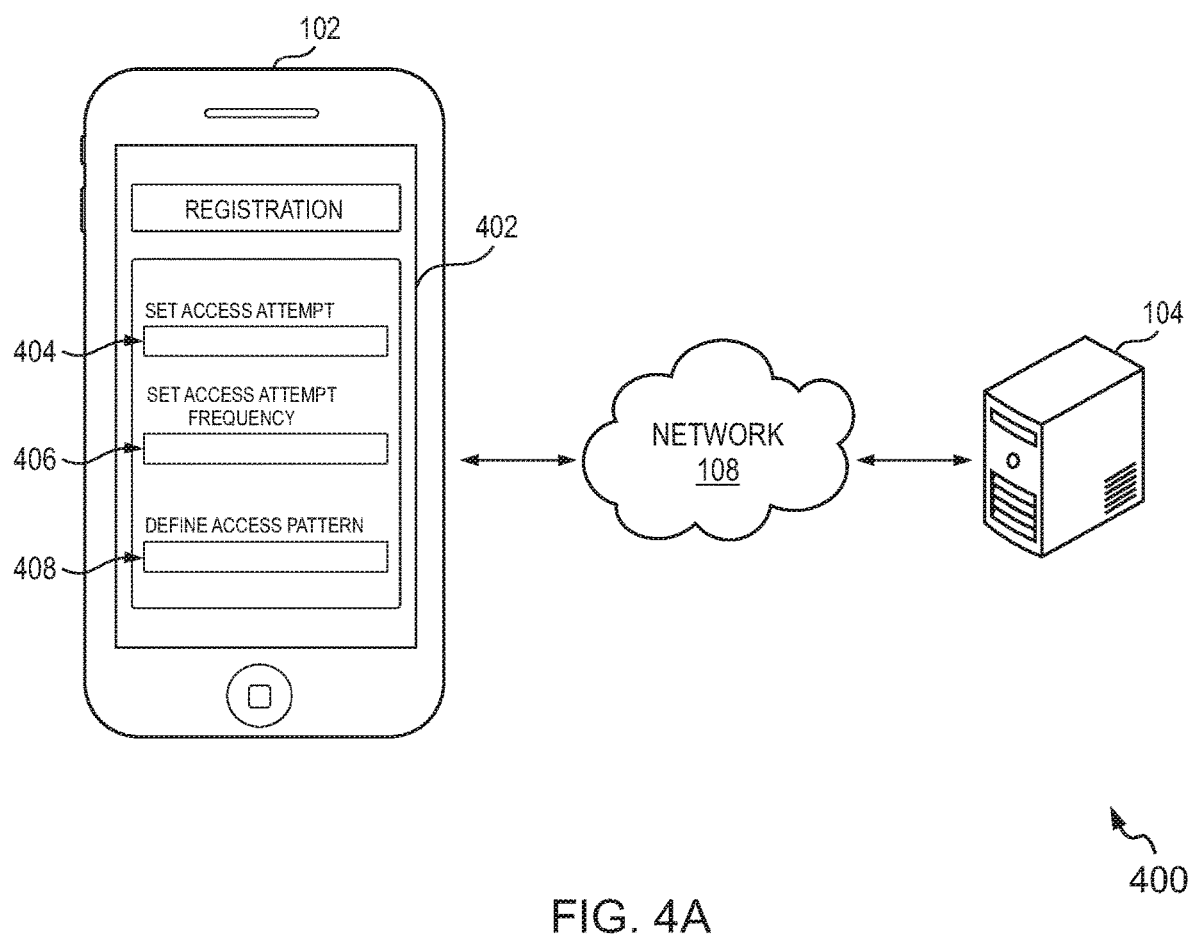
FIG. 4A illustrates an interface enabling defining the one or more token configuration parameters on the client device, in accordance with an example embodiment of the present disclosure.

Referring now to FIG. 4A, an interface 402 enabling defining of the one or more token configuration parameters on the client device 102, in accordance with an example embodiment of the present disclosure. The interface 402 may presented to the user on the client device 102 upon accessing the application installed on the client device 102 before an API session is established between the client device 102 and the API server 106. The interface 402 is a registration page and allows registration of the user and/or the client device 102. The interface 402 presents an access attempt field 404, an access attempt frequency field 406 and an access pattern field 408. The access attempt field 404 allows the user to enter a number which indicates a maximum number of access attempt using a valid token in a single API session.

As an example, the user may define the maximum number of access attempts in an API session as '5'. The access attempt frequency field 406 allows the user to enter a range of frequencies based on any time unit such as per second, per minute, per hour, per day, per week, per month, etc. in any time. As an example, the user may define the frequency range of access attempts using a valid token in an API session as '1-3' access attempts per second. The access pattern field 408 allows the user to enter a pattern identifier of token access. As an example, based on historical access patterns, a defined access pattern of a token in an API session may appear as first API call is received from an application feature A, second API call is received from an application feature B and a third API call is received from an application feature C. An example pattern identifier in this case may be 1A2B3C.

The token server 104 is configured to facilitate validation of a token received in a token validation request from the API server 106 for an API call of the client device 102. For example, the token server 104 checks whether the token received from the API server 106 is a valid token that conforms to one or more token configuration parameters. Based on such checking, the token server 104 processes the token validation request.

It shall be noted that, in a client-server communication, the API server 106 may receive malicious API requests from unauthorized sources posing as the client device 102. These unauthorized sources may send tokens in the API requests, which may be alike in appearance with the valid token generated by the token server 104. It is desired that the API server 106 validates such tokens with the token server 104 in order to prevent breach attempt by malicious entities, tools or software. Upon receiving the token, the API server 106 now requests the token server 104 for validation of the token. Validation of the token is described with reference to FIG. 5.

Referring now to FIG. 4B, a schematic representation of a table 400 containing token parameters is shown, in accordance with an example embodiment of present disclosure. As shown in the table 400, in column 402, client device identifiers (IDs) are provided. For each client device ID, corresponding token is provided in the column 404, and one or more token configuration parameters are populated in columns such as columns 406, 408a, 408b, 408c, 408d, and 410a, 410b. For instance, in the column 406, a number of access attempts is defined. The column 408a contains a frequency of access attempts in a second, the column 408b contains a frequency of access attempts in a minute, the column 408c contains a frequency of access attempts in an hour, and the column 408d contains a frequency of access attempts in a single day. Further, the column 410a contains an access pattern of token for an application 'X', and the column 410b contains an access pattern of token for an application 'Y'.

As illustrated in FIG. 4B, for the client ID 'XYZ', a token 'ABCDEFGHI123' is generated, and the number of access attempts is configured as '3', and the frequency of using the access token in a second is '1', in a minute is '3', in an hour is '6' and in a day is '20'. When the client with client ID 'XYZ' accesses the application 'X', a typical access pattern is deduced as F1F4F7 (among various features F1 to F10 of the application 'X'). Similarly, when the client with client ID 'XYZ' accesses the application 'Y', a typical access pattern is deduced as F2F4F6 (among various features F1 to F10 of the application 'Y').

For the client ID 'LMO', a token 'XYZDEFGHI567' is generated, the number of access attempts is configured as '4', and the frequency of using the access token in a second is '1', in a minute is '4', in an hour is '10' and in a day is '25'. When the client with client ID 'LMO' accesses the application 'X', a typical access pattern is deduced as F1F2F3 (among various features F1 to F10 of the application 'X'). Similarly, when the client with client ID 'LMO' accesses the application 'Y', a typical access pattern is deduced as F1F4F6 (among various features F1 to F10 of the application 'Y').

In an embodiment, the access pattern for a client for an application can be defined by the client itself. For instance, the client with client ID 'LMO' defines that whenever the application 'X' will be accessed by the client, it will be in sequence of F1F2F3 features/pages of the application 'X'. In other words, a normal usage pattern of the application 'X' by the client suggests that tokens are used for authentication/access of F1F2F3 features of the application 'X'.

In another embodiment, the access pattern may be gathered from the usage pattern of the tokens when the client accesses the application 'Y'. For instance, the token server 104 or the application server 106 store a pattern in which the client uses tokens for accessing the application 'Y' over a pre-defined period, say 1 month. For instance, when it is observed that client accesses the application 'Y' by using tokens for the features F1F4F6 majority of the times over the last month, the access pattern for the application 'Y' can be set as F1F4F6. It is also noted that the access pattern can be dynamic and can keep changing on the basis of any changes in the usage pattern of the application 'Y' by the client.

Figure 5:
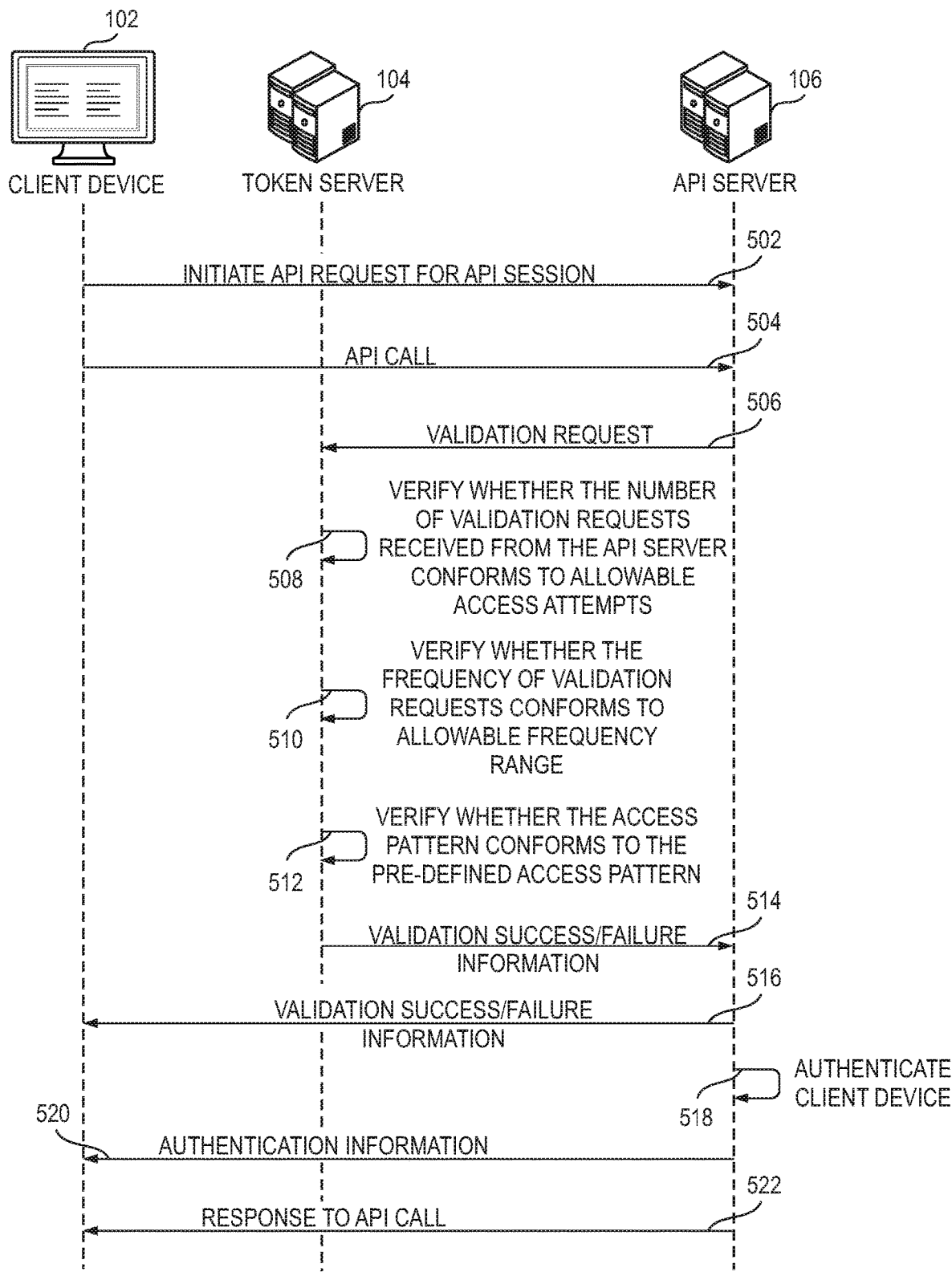
FIG. 5 illustrates a schematic flow diagram representing a method of facilitating a client-server communication using access tokens, in accordance with an example embodiment of the present disclosure.

FIG. 5 illustrates a schematic flow diagram 500 representing a method of facilitating a client-server communication using a token, in accordance with an example embodiment of the present disclosure. The client device 102 or the application make an API call to the API server 106. It shall be noted that, there may be a plurality of API calls and responses between the client device 102 and the API server 106 in an API session until the token expires. It shall be noted that an unauthorized external device/source may pose as the client device 102 and send malicious token which may be exactly like the valid token.

At 502, an API request/call for an API session is initiated at the client device 102 in the application. At 504, the API request is sent to the API server 106 from the client device 102. The API request includes a token. The token received in the API request may be the valid token generated at operation 310 described with respect to FIG. 3. On the other hand, the token received in the API request may not be the valid token generated at operation 310 and may be a malicious token sent by an unauthorized entity or software while attempting fraudulent activities. It should be noted that an API session may include multiple API calls from the client device 102 to the API server 106.

At 506, the API server 106 sends a token validation request to the token server 104 to request validation of the token. The token validation request includes the token received by the API server 106. Validation of the token herein refers to determining whether the token conforms to the one or more configuration parameters. Further validation may refer to determining if the received token is generated by the token server 104 and exists in the token server 104 and whether the token possesses properties possessed by a valid token generated by the token server 104 for the client device 102.

At 508, the token server 104 verifies whether access attempts using the token in a predefined time during an API session conforms to the user configured allowable access attempt using the valid token during an API session. In other words, the token server 104 verifies whether the number of validation requests received from the API server 106 in a predefined time is within the number of allowable access attempts. As an example, the user may define the maximum number of access attempts in an API session as '5'. Now, if the token server 104 receives validation request for a number of times that exceeds 5, the token server 104 may interpret it as a breach attempt by an intruder or an unwanted party. In an embodiment, upon determining such a breach attempt, the token server 104 may cause the token to expire and generate new token(s). The token server 104 further provides instructions to the client device 102 to renew the token upon determining a breach attempt.

At 510, the token server 104 verifies whether the frequency of access attempts using the token in a predefined time conforms to the user configured allowable frequency range. In other words, the token server 104 verifies whether the frequency at which the validation requests are received from the API server 106 in a predefined time conforms to the allowable frequency range. As an example, the token access frequency can be based on any time unit such as per second, per minute, per hour, per day, per week, per month, etc. As an example, the user may define the frequency range of access attempts in an API session as '1-3' access attempts per second. Now, if the token server 104 receives validation request for a number of times that is less than the lower limit, i.e. 1 and/or higher than the upper limit i.e. 3, the token server 104 may interpret that the frequency of access attempts using the token is less than 1 or higher than 3, which is not within the allowable range of frequency. The token server 104 then identifies a breach attempt and can thereby cause the token to expire and generate new token(s).

At 512, the token server 104 verifies whether an access pattern using the token conforms to a pre-defined access pattern. It shall be noted that the pre-defined access pattern is determined based on historical access patterns using tokens during API session between the client device 102 or the application installed at the client device 102 and the API server 106. It shall further be noted that the pre-defined access pattern may also be determined based on historical access patterns using tokens during API sessions between various other applications installed at devices other than the client device 102 and the API server 106. It shall also be noted that the pre-defined access pattern may again be determined based on historical access patterns using tokens during API sessions between the client device 102 or the application installed at the client device 102 and various other API servers. A pattern may be identified in terms of a pattern identifier. As an example, based on historical access patterns, a defined access pattern of a token in an API session may appear as first API call is received from an application feature A, second API call is received from an application feature B and a third API call is received from an application feature API C. Any deviation in the pattern in accessing the token may be interpreted as an invalid pattern and a breach attempt may be identified. Upon identification of the breach attempt, the token server 104 can cause the token to expire and generate new token(s).

At 514, validation information may be sent to the API server 106. The validation information may include a notification of validation success or validation failure.

At 516, the API server 106 informs the client device 102 of the successful validation of the token provided by the client device 102 as part of the API call. The API server 106 may inform the authentication notification to the client device 102 by a simple handshake message, or in form of text message or email. At 518, the API server 106 authenticates the client device 102 or the application installed at the client device 102 upon successful validation.

At 520, an authentication information is sent to the client device 102 in the application. Alternatively, the client device 102 receives the authentication notification in form of text message or email.

At 522, the API server 106 exchanges information requested in the API calls during the API session with the client device 102 or the application installed at the client device 102.

Figure 6:
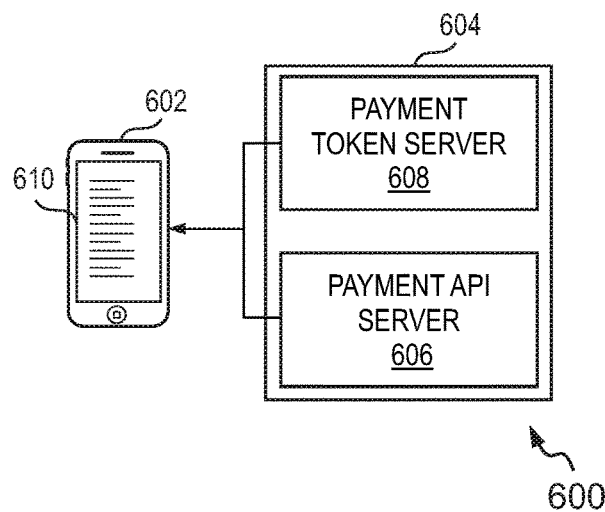
FIGS. 6, 7 and 8 illustrate simplified schematic representations displaying different configurations of a client device, token server and application server for facilitating identification of breach attempts in a client-server communication, in accordance with one embodiment of the present disclosure.
Figure 7:
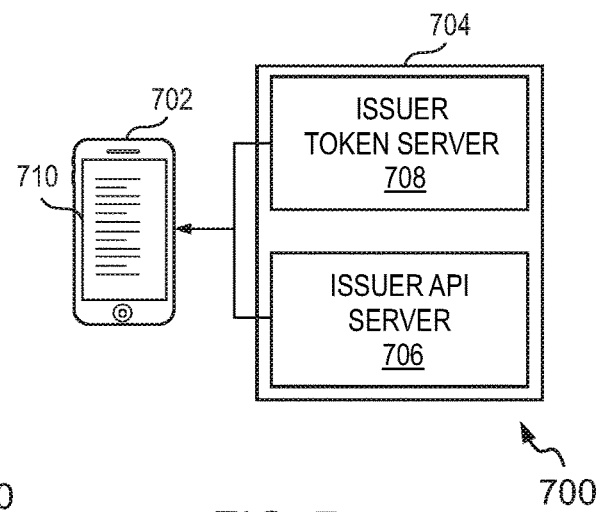
Figure 8:
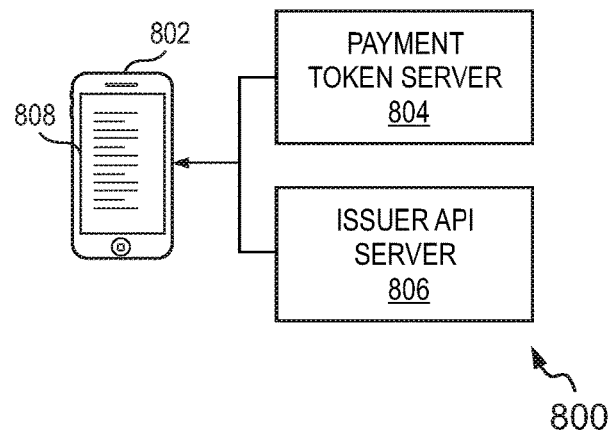

FIGS. 6, 7 and 8 illustrate simplified schematic representation 600, 700 and 800 respectively, displaying different configurations of a client device, token server and application server for facilitating identification of breach attempts in a client-server communication, in accordance with one embodiment of the present disclosure.

Referring to FIG. 6, a client device 602 and a server system 604 are in operative communication for identification of breach attempts in a client-server communication using access tokens. As seen in FIG. 6, a payment token server 608 and a payment API server 606 are hosted/managed by the same entity i.e. payment cards issuing authorities such as a payment interchange network. An application 610 hosted/managed by the payment API server 606 runs on the client device 602. In an example, the client device 602 may be an electronic device such as a smartphone of a user, and the application 610 may be a payment application such an application provided by Mastercard® or a digital wallet application. Further, the payment API server 606 can be a payment server of a payment network, and the payment token server 608 may be a server configured to generate tokens for services associated with the payment API server 606.

It shall be noted that by accessing the application 610, a session may be established between the payment token server 608 and the client device 602 for generation of tokens. The client device 602 defines one or more token configuration parameters and the payment token server 608 uses the one or more token configuration parameters for validation of the token when the token is received from the payment API server 606. Further, handshaking operations may be performed between the client device 602 and the payment token server 608 to establish the validity of the valid token. Once the validity of the valid token is established, the valid token can be used by the client device 602 to make API calls to the payment API server 606. Some non-exhaustive examples of the token configuration parameters include a number of allowable access attempts using the valid token in the API session, and a range of frequency of allowable access attempts using the valid token in the API session or in a pre-defined time period such as an hour or a day. The token configuration parameters also include an allowed access pattern for the API session associated with the token, wherein the allowed access pattern for the API session is determined based on historical access patterns followed in previous API sessions.

Subsequently, an API session is initiated in the application 610 between the client device 602 and the payment API server 606 using a token generated by the payment token server 608. During the API session, the payment API server 606 sends a token validation request to the payment token server 608. The validation request may include the token received from the payment API server 606. As part of validation, the payment token server 608 verifies whether the token conforms to the one or more token configuration parameters stored with the payment token server 608. Upon successful validation, the payment API server 606 authenticates the client device 602.

For instance, when the client device 602 uses the application 610 for making a payment, the client device 602 sends a token as part of one or more API calls, to the payment API server 606. The payment API server 606 further provides the received token to the payment token server 608. Thereafter, the payment token server 608 validates the one or more API calls for payment based on checking whether the token conforms to at least one of the one or more token configuration parameters.

Referring to FIG. 7, a client device 702 and a server system 704 are in operative communication for identification of breach attempts in a client-server communication using access tokens. As seen in FIG. 7, an issuer token server 708 and an issuer API server 706 are hosted/managed by the same entity i.e. a financial institution or a bank. An application 710 hosted/managed by the issuer API server 706 runs on the client device 702. It shall be noted that by accessing the application 710, a session may be established between the issuer token server 708 and the client device 702 for generation of valid tokens. The client device 702 defines one or more token configuration parameters, and the issuer token server 708 uses the one or more token configuration parameters for validation of the token. The one or more token configuration parameters include one or more of a number of allowable access attempts using the token in the API session and a range of frequency of allowable access attempts using the token in the API session. The token configuration parameters also include an allowed access pattern for the API session associated with the token, wherein the allowed access pattern for the API session is determined based on historical access patterns followed in previous API sessions.

Subsequently, an API session is initiated in the application 710 between the client device 702 and the issuer API server 706 using a token generated by the issuer token server 708. During the API session, the issuer API server 706 sends a token validation request to the payment token server 608. The token validation request may include the token received from the client device 702. As part of validation, the issuer token server 708 verifies whether the token conforms to the one or more token configuration parameters. Upon successful validation, the issuer API server 706 authenticates the client device 702. For instance, when the client device 702 uses the application 710 for making a payment, the client device 702 sends a token as part of one or more API calls, to the issuer API server 706. The issuer API server 706 further provides the received token to the issuer token server 708. Thereafter, the issuer token server 708 validates the one or more API calls for payment based on checking whether the token conforms to at least one of the one or more token configuration parameters.

Referring to FIG. 8, a client device 802, a payment token server 804 and an issuer API server 806 are in operative communication for identification of breach attempts in a client-server communication using access tokens. As seen in FIG. 8, the payment token server 804 is hosted/managed by a payment cards issuing authority such as a payment interchange network and the issuer API server 806 is hosted/managed by a financial institution or a bank. An application 808 hosted/managed by the issuer API server 806 runs on the client device 802. It shall be noted that by accessing the application 808, a session may be established between the payment token server 804 and the client device 802 for generation of valid tokens.

The client device 802 defines one or more token configuration parameters and the payment token server 804 uses the one or more token configuration parameters for validation of the token. The one or more token configuration parameters include one or more of a number of allowable access attempts using the valid token in the API session and a range of frequency of allowable access attempts using the valid token in the API session. The token configuration parameters also include an allowed access pattern for the API session associated with the token, wherein the allowed access pattern for the API session is determined based on historical access patterns followed in previous API sessions.

Subsequently, an API session is initiated in the application 808 between the client device 802 and the issuer API server 806 using the token generated by the payment token server 804. During the API session, the issuer API server 806 sends token validation request to the payment token server 804. The validation request may include the token received from the client device 802. As part of validation, the payment token server 804 verifies whether the token conforms to the one or more token configuration parameters. Upon successful validation, the issuer API server 806 authenticates the client device 802.

Figure 9:
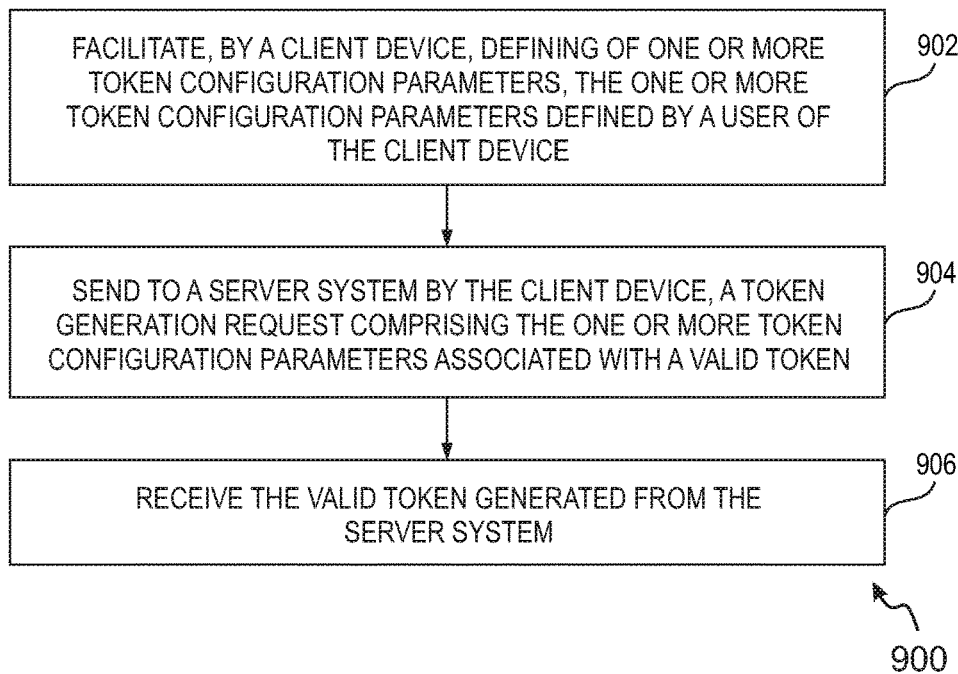
FIG. 9 illustrates a flow diagram of a method for facilitating generation of the token and determining a breach attempt associated with the token, in accordance with an example embodiment of the present disclosure

FIG. 9 illustrates a flow diagram of a method 900 for facilitating generation of valid tokens, in accordance with an example embodiment of the present disclosure. The method 900 depicted in the flow diagram may be executed by, for example, the client device 102. Operations of the flow diagram 900, and combinations of operations in the flow diagram 900, may be implemented by, for example, hardware, firmware, a processor, circuitry and/or a different device associated with the execution of software that includes one or more computer program instructions. The operations of the method 900 are described herein with help of the client device 102. It is noted that the operations of the method 900 can be described and/or practiced by using a system other than the client device 102. The method 900 starts at operation 902.

At 902, the client device 102 facilitates defining of one or more token configuration parameters. The one or more token configuration parameters are defined by a user of the client device 102. It shall be noted that the application managed by the API server 106 and running on the client device 102 provides a user interface (UI) where a user of the client device 102 can define the one or more token configuration parameters.

At 904, the client device 102 sends to a server system such as the token server 104, a token generation request comprising the one or more token configuration parameters which are associated with a valid token. The token generation request may also include client device authentication parameters such as client ID, client device ID, etc.

At 906, the client device 102 receives the valid token generated by the server system from the server system. It shall be noted that the valid token is sent to the client device 102 as part of a handshake between the client device 102 and the token server 104.

In some scenarios, the API server 106 may receive malicious API requests from unauthorized sources posing as the client device 102. These unauthorized sources may send tokens in the API requests, which may be similar in appearance with the token generated by the token server 104. It is desired that the API server 106 validates such tokens with the token server 104 in order to prevent breach attempt by malicious entities, tools or software. Sending the token for validation is described with reference to FIG. 10.

Figure 10:
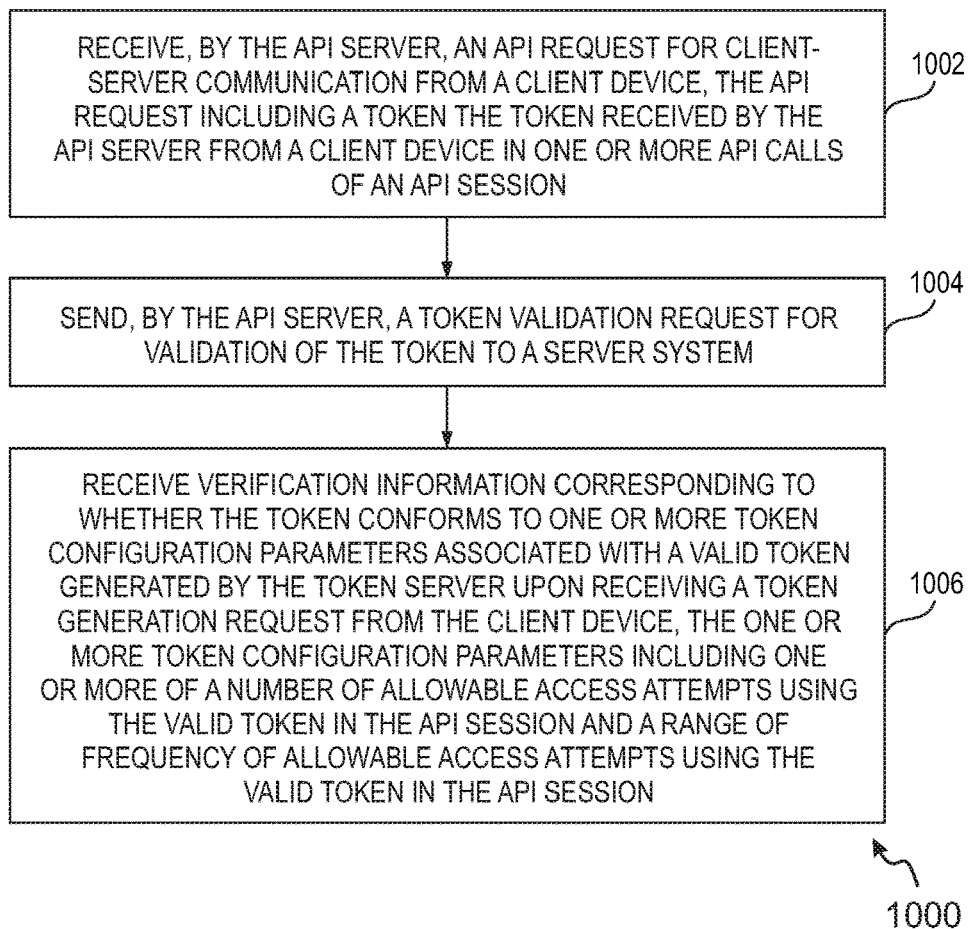
FIG. 10 illustrates a flow diagram of a method for sending validation request for validation of the token and determining a breach attempt associated with the token, in accordance with an example embodiment of the present disclosure.

FIG. 10 illustrates a flow diagram of a method 1000 for sending validation request for validation of a token, in accordance with an example embodiment of the present disclosure. The method 1000 depicted in the flow diagram may be executed by, for example, the API server 106. Operations of the flow diagram 1000, and combinations of operations in the flow diagram 1000, may be implemented by, for example, hardware, firmware, a processor, circuitry and/or a different device associated with the execution of software that includes one or more computer program instructions. The operations of the method 1000 are described herein with help of the API server 106. It is noted that the operations of the method 1000 can be described and/or practiced by using a system other than the API server 106. The method 1000 starts at operation 1002.

At 1002, the API server 106 receives an API request for client-server communication from the client device 102. The API request comprises a token. It shall be noted that the token received in the API request may or may not be the one generated by the token server 104. It shall further be noted that the token may be received from an external unauthorized source posing as the client device 102.

At 1004, the API server 106 sends a token validation request for validation of the token to a server system such as the token server 104. The token is received by the API server 106 from a client device such as the client device 102 in one or more API calls of an API session. The token server 104 receives a token validation request from the API server 106 for validation of the token. The token may be sent from the client device 102 to the API server 106 in one or more API calls of an API session.

At 1006, the API server 106 receives verification information corresponding to whether the token conforms to one or more token configuration parameters. The token configuration parameters are already available with the token server 104, as these parameters are defined while generation of the token by the token server upon receiving a token generation request from the client device 102. As an example, the token server 104 verifies whether the number of validation requests received from the API server 106 during a predefined time conforms to the allowable access attempts defined/configured by the user. Further, token server 104 verifies whether the frequency of validation requests received from the API server 106 conforms to the allowable frequency range defined/configured by the user. Additionally, the token server 104 may verify whether the access pattern conforms to the defined access pattern.

In an example embodiment, the token server 104 verifies whether access attempts using the token in a predefined time during an API session conforms to the user configured allowable access attempt during an API session. In other words, the token server 104 verifies whether the number of validation requests received from the API server 106 in a predefined time is within the number of allowable access attempts. As an example, the user may define the maximum number of access attempts in an API session as '5'. Now, if the token server 104 receives validation request for a number of times that exceeds 5, it may interpreted as a breach attempt by the token server 104. Upon determining such a breach attempt, the token server 104 may cause the token to expire and generate new token(s). Additionally or alternatively, the token server 104 verifies whether the frequency of access attempts using the token in a predefined time conforms to the user configured allowable frequency range. In other words, the token server 104 verifies whether the frequency at which the validation requests are received from the API server 106 in a predefined time conforms to the allowable frequency range. As an example, the token access frequency can be based on any time unit such as per second, per minute, per hour, per day, per week, per month, etc. As an example, the user may define the frequency range of access attempts in an API session as '1-3' access attempts per second. Now, if the token server 104 receives validation request for a number of times that is less than the lower limit, i.e. 1 and/or higher than the upper limit i.e. 3, the token server 104 may interpret that the frequency of access attempts using the token is less than 1 or higher than 3, which is not within the allowable range of frequency. The token server 104 then identifies a breach attempt and can thereby cause the token to expire and generate new token(s).

Moreover, the token server 104 verifies whether an access pattern using the token conforms to a pre-defined access pattern. It shall be noted that the pre-defined access pattern is defined based on historical access patterns using tokens during API session between the client device 102 or the application installed at the client device 102 and the API server 106. It shall further be noted that the pre-defined access pattern may also defined based on historical access patterns using tokens during API sessions between various other applications installed at devices other than the client device 102 and the API server 106. It shall also be noted that the pre-defined access pattern may again be defined based on historical access patterns using tokens during API sessions between the client device 102 or the application installed at the client device 102 and various other API servers. A pattern may be identified in terms of a pattern identifier. As an example, based on historical access patterns, a defined access pattern of a token in an API session may appear as first API call is received from an application feature A, second API call is received from an application feature B and a third API call is received from an application feature C. Any deviation in the pattern in accessing the token may be interpreted as an invalid pattern and a breach attempt may be identified. Upon identification of the breach attempt, the token server 104 can cause the token to expire. The token server 104 further provides instructions to the client device 102 to renew the token upon determining a breach attempt.

Figure 11:
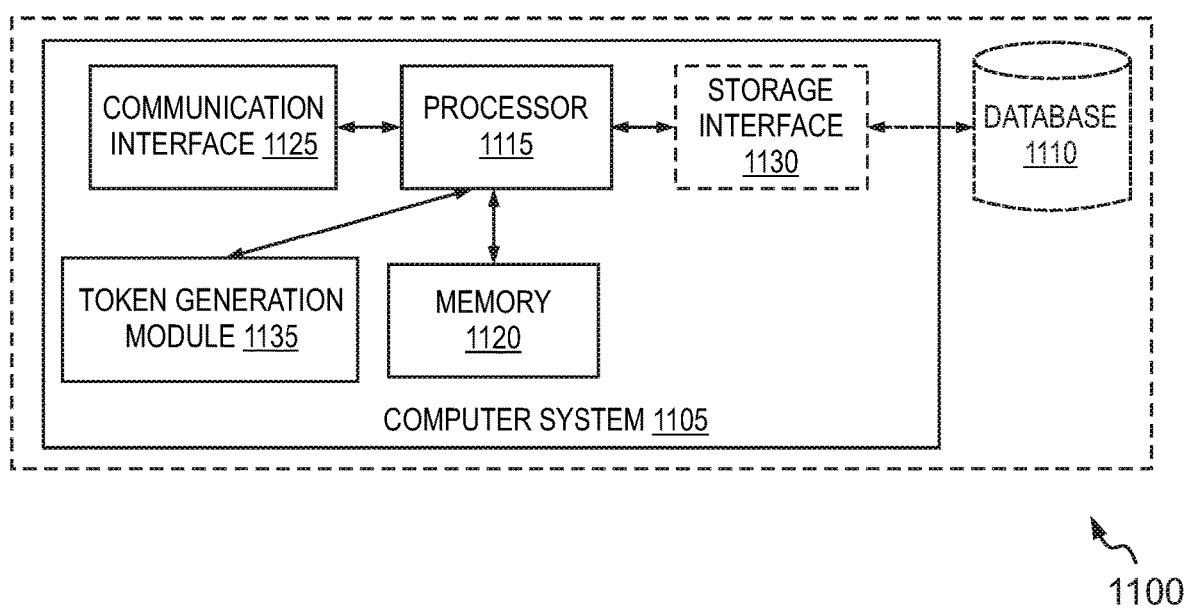
FIG. 11 is a simplified block diagram of a server system, in accordance with one embodiment of the present disclosure.

FIG. 11 is a simplified block diagram of a server system 1100, in accordance with one embodiment of the present disclosure. The server system 1100 is an example of the token server 104 of FIG. 1. The server system 1100 includes a computer system 1105 and a database 1110. The computer system 1105 includes a processor 1115 for executing instructions. Instructions may be stored in, for example, but not limited to, a memory 1120. The processor 1115 may include one or more processing units (e.g., in a multi-core configuration). The processor 1115 is operatively coupled to a communication interface 1125 such that the computer system 1105 can communicate with the client device 102. For example, the communication interface 1125 may receive the token generation request from the client device 102.

The processor 1115 may also be operatively coupled to the database 1110. The database 1110 is any computer-operated hardware suitable for storing and/or retrieving data. The database 1110 may include multiple storage units such as hard disks and/or solid-state disks in a redundant array of inexpensive disks (RAID) configuration. The database 1110 may include, but not limited to, a storage area network (SAN) and/or a network attached storage (NAS) system. In some embodiments, the database 1110 is integrated within the computer system 1105. For example, the computer system 1105 may include one or more hard disk drives as the database 1110. In other embodiments, the database 1110 is external to the computer system 1105 and may be accessed by the computer system 1105 using a storage interface 1130. The storage interface 1130 is any component capable of providing the processor 1115 with access to the database 1110. The storage interface 1130 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1115 with access to the database 1110.

The computer system 1105 further includes a token generation module 1135. The token generation module 1135 may be configured to generate valid tokens as per the one or more token configuration parameters defined in the client device 102. The token generation module 1135 may store the token configuration parameters defined in the client device 102 for a predefined time until new token configuration parameters are received from the client device 102. The token generation module 1135 uses the communication interface 1125 to send the generated token to the client device 102.

Figure 12:
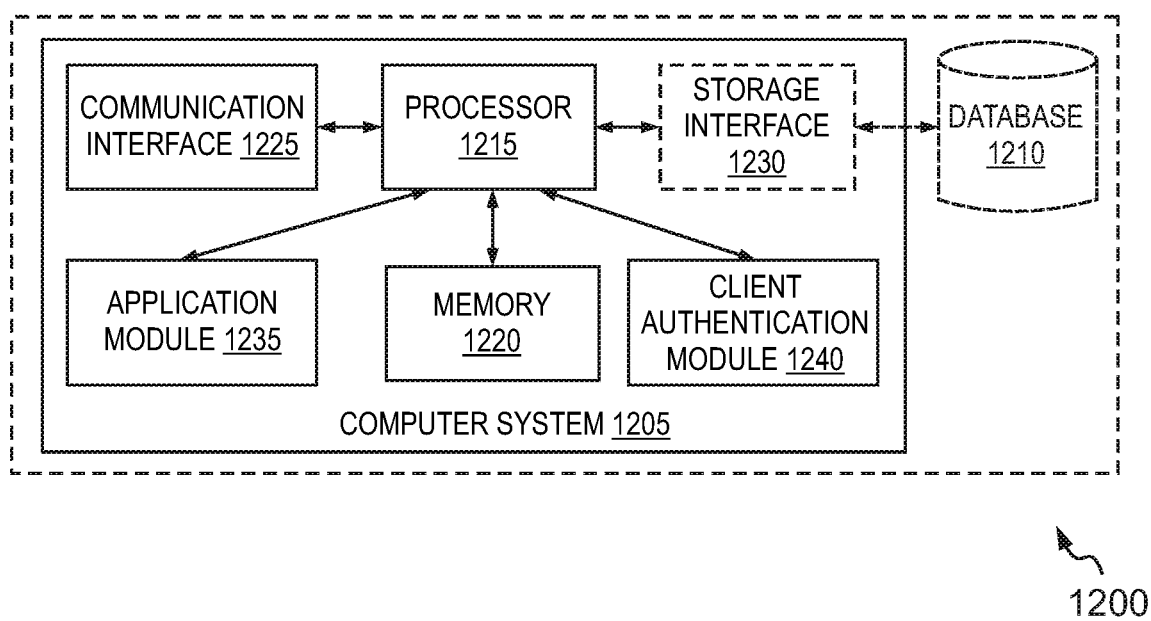
FIG. 12 is a simplified block diagram of another server system, in accordance with one embodiment of the present disclosure.

FIG. 12 is a simplified block diagram of another server system 1200, in accordance with one embodiment of the present disclosure. The server system 1200 is an example of the API server 106 of FIG. 1. The server system 1200 includes a computer system 1205 and a database 1210. The computer system 1205 includes a processor 1215 for executing instructions. Instructions may be stored in, for example, but not limited to, a memory 1220. The processor 1215 may include one or more processing units (e.g., in a multi-core configuration). The processor 1215 is operatively coupled to a communication interface 1225 such that computer system 1205 can communicate with the client device 102. For example, the communication interface 1225 may receive the token generation request from the client device 102.

The processor 1215 may also be operatively coupled to the database 1210. The database 1210 is any computer-operated hardware suitable for storing and/or retrieving data. The database 1210 may include multiple storage units such as hard disks and/or solid-state disks in a redundant array of inexpensive disks (RAID) configuration. The database 1210 may include, but not limited to, a storage area network (SAN) and/or a network attached storage (NAS) system. In some embodiments, the database 1210 is integrated within the computer system 1205. For example, the computer system 1205 may include one or more hard disk drives as the database 1210. In other embodiments, the database 1210 is external to the computer system 1205 and may be accessed by the computer system 1205 using a storage interface 1230. The storage interface 1230 is any component capable of providing the processor 1215 with access to the database 1210. The storage interface 1230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1215 with access to the database 1210.

The computer system 1205 further includes an application module 1235. The application module 1235 is configured to implement features of the application on the client device 102 upon installation. As an example, the application may be a payment transaction application. The application module 1235 may be configured to receive payment transaction related information and user information from the client device 102. The application module 1235 further sends response to the payment transaction related information and the user information to the client device 102. The application module 1235 may be configured to enable the client device 102 to define the token configuration parameters for valid tokens.

The processor 1215 is configured to generate a token validation request and use the communication interface 1225 to send the token validation request to the server system 1200.

The computer system 1205 further includes a client authentication module 1240 that enables authentication of a client device or an application running on the client device upon successful validation of a token received from the client device.

Figure 13:
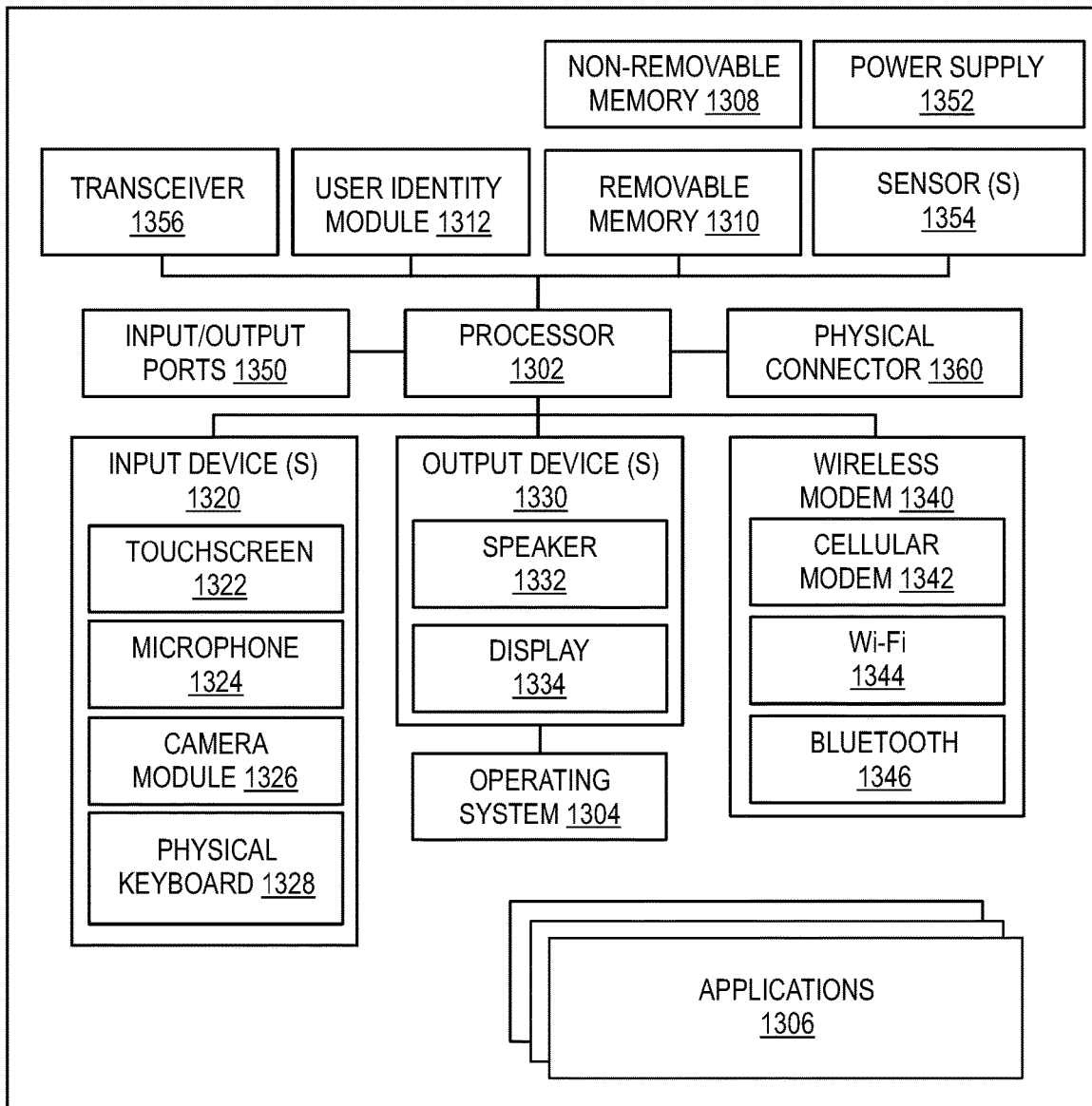
FIG. 13 shows simplified block diagram of a user device, such as the client device, in accordance with one embodiment of the present disclosure.

FIG. 13 shows simplified block diagram of a user device 1300, such as the client device 102 of FIG. 1. The user device 1300, for example, can be a desktop computer or a mobile phone capable of implementing the various embodiments of the present disclosure. The user device 1300 is depicted to includes applications 1306.

It should be understood that the user device 1300 as illustrated and hereinafter described is merely illustrative of one type of device and should not be taken to limit the scope of the embodiments. As such, it should be appreciated that at least some of the components described below in connection with that the user device 1300 may be optional and thus in an example embodiment may include more, less or different components than those described in connection with the example embodiment of the FIG. 13. As such, among other examples, the user device 1300 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1300 includes a controller or a processor 1302 (e.g., a signal processor, microprocessor, ASIC, or other control and processing logic circuitry) for performing such tasks as signal coding, data processing, image processing, input/output processing, power control, and/or other functions. An operating system 1304 controls the allocation and usage of the components of the user device 1300 and support for one or more applications programs (see, applications 1306), that implements one or more of the innovative features described herein. The applications 1306 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1300 includes one or more memory components, for example, a non-removable memory 1308 and/or removable memory 1310. The non-removable memory 1308 and/or the removable memory 1310 may be collectively known as database in an embodiment. The non-removable memory 1308 can include RAM, ROM, flash memory, a hard disk, or other well-known memory storage technologies. The removable memory 1310 can include flash memory, smart cards, or a Subscriber Identity Module (SIM). The one or more memory components can be used for storing data and/or code for running the operating system 1304 and the applications 1306. The user device 1300 may further include a user identity module (UIM) 1312. The UIM 1312 may be a memory device having a processor built in. The UIM 1312 may include, for example, a subscriber identity module (SIM), a universal integrated circuit card (UICC), a universal subscriber identity module (USIM), a removable user identity module (R-UIM), or any other smart card. The UIM 1312 typically stores information elements related to a mobile subscriber. The UIM 1312 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1300 can support one or more input devices 1320 and one or more output devices 1330. Examples of the input devices 1320 may include, but are not limited to, a touch screen/a display screen 1322 (e.g., capable of capturing finger tap inputs, finger gesture inputs, multi-finger tap inputs, multi-finger gesture inputs, or keystroke inputs from a virtual keyboard or keypad), a microphone 1324 (e.g., capable of capturing voice input), a camera module 1326 (e.g., capable of capturing still picture images and/or video images) and a physical keyboard 1328. Examples of the output devices 1330 may include, but are not limited to a speaker 1332 and a display 1334. Other possible output devices can include piezoelectric or other haptic output devices. Some devices can serve more than one input/output function. For example, the touch screen 1322 and the display 1334 can be combined into a single input/output device.

A wireless modem 1340 can be coupled to one or more antennas (not shown in the FIG. 13) and can support two-way communications between the processor 1302 and external devices, as is well understood in the art. The wireless modem 1340 is shown generically and can include, for example, a cellular modem 1342 for communicating at long range with the mobile communication network, a Wi-Fi compatible modem 1344 for communicating at short range with an external Bluetooth-equipped device or a local wireless data network or router, and/or a Bluetooth-compatible modem 1346. The wireless modem 1340 is typically configured for communication with one or more cellular networks, such as a GSM network for data and voice communications within a single cellular network, between cellular networks, or between the user device 1300 and a public switched telephone network (PSTN).

The user device 1300 can further include one or more input/output ports 1350 for establishing connection with peripheral devices including a power supply 1352, one or more sensors 1354 for example, an accelerometer, a gyroscope, a compass, or an infrared proximity sensor for detecting the orientation or motion of the user device 1300 and biometric sensors for scanning biometric identity of an authorized user, a transceiver 1356 (for wirelessly transmitting analog or digital signals) and/or a physical connector 1360, which can be a USB port, IEEE 1294 (FireWire) port, and/or RS-232 port. The illustrated components are not required or all-inclusive, as any of the components shown can be deleted and other components can be added.

The disclosed methods with reference to FIGS. 1 to 13 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1100 (e.g., the token server 104) various components such as the computer system 1105 and the database 1110 may be enabled using software and/or using transistors, logic gates, and electrical circuits (for example, integrated circuit circuitry such as ASIC circuitry).

Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Without in any way limiting the scope, interpretation, or application of the claims appearing below, a technical effect of one or more of the example embodiments disclosed herein is to provide computer implemented methods and server systems for facilitating a client server communication using access tokens. Various embodiments provide a token server for generating tokens using one or more token configuration parameters. Various embodiments provide a system and method for facilitating defining the one or more token configuration parameters by a user at a client device. Various embodiments also provide an application that facilitates API calls between an API server and the client device using a token generated by the token server. Embodiments further provide method of validation of the token by the token server upon reception of a validation request by the token server from the API server for validation of the token. Embodiments further provide checking by the token server whether the token conforms to the one or more token configuration parameters.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method of using access tokens for identification of breach attempts in a client-server communication, the method comprising:
   receiving, by a token server system from a client device, a token generation request, the token generation request comprising at least two token configuration parameters defined by a user of the client device;
   storing, by the token server system, the at least two token configuration parameters;
   generating, by the token server system, a valid token in response to the token generation request;
   transmitting, by the token server system to the client device, the valid token;
   receiving, by the token server system, a token validation request for validation of a token from an Application Programming Interface (API) server, the token validation request comprising the token received by the API server from the client device in one or more API calls of an API session, the token comprising token parameters;
   accessing, by the token server system, the at least two token configuration parameters associated with a valid token for the client, the at least two token configuration parameters comprising:
      a number of allowable access attempts using the valid token in the API session, and
      a range of frequency of allowable access attempts using the valid token in the API session;
   comparing, by the token server system, the token parameters to the at least two token configuration parameters associated with the valid token;
   determining, by the token server system, one of that a number of times the token validation request is received from the API server during the API session exceeds the number of allowable access attempts and that a frequency at which the token validation request is received from the API server during the API session exceeds the range of frequency of allowable access attempts; and
   transmitting, by the token server system to the API server, validation information comprising a validation failure message indicating a breach attempt.

2. The method as claimed in claim 1, wherein the at least two token configuration parameters further comprise an allowed access pattern associated with the valid token.

3. The method as claimed in claim 2, wherein the allowed access pattern is determined based on historical access patterns of the valid token in a pre-defined time period.

4. A server system for using access tokens for identification of breach attempts in a client-server communication, the server system comprising:
   a memory comprising stored instructions; and
   a processor operably connected to the memory and configured to execute stored instructions which when executed cause the server system to perform:
      receive from a client device, a token generation request, the token generation request comprising at least two token configuration parameters defined by a user of the client device;
      store the at least two token configuration parameters;
      generate a valid token in response to the token generation request;
      transmit the valid token to the client device;
      receive a token validation request for validation of a token from an Application Programming Interface (API) server, the token validation request comprising the token received by the API server from the client device in one or more API calls of an API session, the token comprising token parameters;
      access the at least two token configuration parameters associated with a valid token for the client, the at least two token configuration parameters comprising:
         a number of allowable access attempts using the token in the API session, and
         a range of frequency of allowable access attempts using the token in the API session;
      compare the token parameters to the at least two token configuration parameters associated with the valid token; and
      determine one of that a number of times the token validation request is received from the API server during the API session exceeds the number of allowable access attempts and that a frequency at which the token validation request is received from the API server during the API session exceeds the range of frequency of allowable access attempts; and
      transmit validation information to the API server, the validation information comprising a validation failure message indicating a breach attempt.

5. The server system as claimed in claim 4, wherein the token validation request comprises at least an information of:
   a number of access attempts using the valid token during the API session; and
   a frequency of access attempts using the valid token during the API session.

6. The server system as claimed in claim 4, wherein the at least two token configuration parameters further comprise an allowed access pattern associated with the valid token.

7. The server system as claimed in claim 6, wherein the allowed access pattern for the API session is determined based on historical access patterns of the valid token in a pre-defined time period.

8. A method of using access tokens for identification of breach attempts in a client-server communication, the method comprising:
   receiving, by an Application Programming Interface (API) server, an API request for client-server communication, the API request comprising a token, the token received by the API server from a client device in one or more API calls of an API session;
   sending, by the API server, a token validation request for validation of the token to a token server system; and
   receiving verification information corresponding to whether the token conforms to at least two token configuration parameters from the token server system, wherein the at least two token configuration parameters are associated with a valid token generated by the token server upon receiving a token generation request from the client device and are defined by a user of the client device, wherein the at least two token configuration parameters comprise:
      a number of allowable access attempts using the valid token in the API session,
      a range of frequency of allowable access attempts using the valid token in the API session, and an allowed access pattern associated with the token, wherein the allowed access pattern is determined based on historical access patterns of the valid token in previous API sessions taken over a predefined time period.

9. The method of claim 2, further comprising, after comparing the token parameters to the at least two token configuration parameters associated with the valid token:
- determining, by the token server system, that an access pattern does not comply with the allowed access pattern associated with the valid token; and
- transmitting, by the token server system to the API server, validation information comprising a validation failure message indicating a breach attempt.

10. The server system as claimed in claim 6, wherein the memory stores further instructions causing the processor which when executed cause the server system to perform, after comparing the token parameters to the at least two token configuration parameters associated with the valid token:
- determine that an access pattern does not comply with the allowed access pattern associated with the valid token; and
- transmit validation information to the API server, wherein the validation information comprises a validation failure message indicating a breach attempt.

* * * * *